US010990857B2

(12) United States Patent
Lim et al.

(10) Patent No.: US 10,990,857 B2
(45) Date of Patent: Apr. 27, 2021

(54) OBJECT DETECTION AND LEARNING METHOD AND APPARATUS

(71) Applicants: SAMSUNG ELECTRONICS CO., LTD., Suwon-si (KR); SNU R&DB FOUNDATION, Seoul (KR)

(72) Inventors: Bee Lim, Seoul (KR); Changhyun Kim, Seongnam-si (KR); Kyoung Mu Lee, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 166 days.

(21) Appl. No.: 16/408,702

(22) Filed: May 10, 2019

(65) Prior Publication Data

US 2020/0065635 A1   Feb. 27, 2020

(30) Foreign Application Priority Data

Aug. 23, 2018 (KR) .................. 10-2018-0098379

(51) Int. Cl.
*G06K 9/62* (2006.01)
*G06K 9/46* (2006.01)
*G06K 9/66* (2006.01)
*G06N 3/08* (2006.01)
*G06T 7/77* (2017.01)

(52) U.S. Cl.
CPC ............ *G06K 9/6298* (2013.01); *G06K 9/46* (2013.01); *G06K 9/6257* (2013.01); *G06K 9/66* (2013.01); *G06N 3/08* (2013.01); *G06T 7/77* (2017.01)

(58) Field of Classification Search
CPC .......... G06K 9/6298; G06K 9/46; G06K 9/66; G06K 9/6257; G06K 9/00791; G06N 3/08; G06N 3/084; G06N 3/0454; G06N 3/0472; G06T 7/77; G06T 2207/20084; G06T 2207/20081; G06T 7/73
USPC ......................................................... 382/156
See application file for complete search history.

(56) References Cited

U.S. PATENT DOCUMENTS

| | | |
|---|---|---|
| 7,490,031 B1 | 2/2009 | Qiu |
| 9,256,957 B1 | 2/2016 | Frey et al. |
| 9,361,409 B2 | 6/2016 | Kozloski et al. |
| 9,576,083 B2 | 2/2017 | Kozloski et al. |
| 9,639,748 B2 | 5/2017 | Porikli et al. |
| 9,881,234 B2 | 1/2018 | Huang et al. |
| 9,914,213 B2 | 3/2018 | Vijayanarasimhan et al. |
| 10,373,055 B1 * | 8/2019 | Matthey-de-l'Endroit ............... G06N 3/0454 |
| 2017/0364757 A1 | 12/2017 | Rajabizadeh et al. |
| 2018/0039853 A1 | 2/2018 | Liu et al. |
| 2018/0068198 A1 | 3/2018 | Savvides et al. |
| 2019/0057520 A1 * | 2/2019 | Cinnamon ............ G06T 9/002 |
| 2019/0244060 A1 * | 8/2019 | Dundar ............... G06K 9/6256 |

(Continued)

FOREIGN PATENT DOCUMENTS

| | | |
|---|---|---|
| JP | 2009-95032 A | 4/2009 |
| KR | 10-1347598 B1 | 1/2014 |
| KR | 10-2017-0070715 A | 6/2017 |

*Primary Examiner* — Juan A Torres
(74) *Attorney, Agent, or Firm* — NSIP Law (57) ABSTRACT

A processor-implemented object detection method is provided. The method receives an input image, generates a latent variable that indicates a feature distribution of the input image, and detects an object in the input image based on the generated latent variable.

20 Claims, 9 Drawing Sheets

(56) References Cited

U.S. PATENT DOCUMENTS

2019/0355150 A1* 11/2019 Tremblay ............. G06N 3/0454

* cited by examiner

Training with real images
- - - - - - - - - - - - - - - - - - - - - - - - - - - - - - - - - - -
Training with fake images

OBJECT DETECTION AND LEARNING METHOD AND APPARATUS

CROSS-REFERENCE TO RELATED APPLICATIONS

This application claims the benefit under 35 USC § 119(a) of Korean Patent Application No. 10-2018-0098379 filed on Aug. 23, 2018 in the Korean Intellectual Property Office, the entire disclosure of which is incorporated herein by reference for all purposes.

BACKGROUND

1. Field

The following description relates to an object detection method and apparatus.

2. Description of Related Art

Recognition and detection of an object for automatic driving may be performed through the capture and analysis of a driving image of a vehicle. Recognition and detection of the object may be performed through learning using a large number of image data sets that are estimated to be similar to an actual driving environment. If the number of data sets is small, learning may not be sufficiently performed. Alternatively, a model may be overfitting only for a corresponding data set. To outperform such an overfitting issue, a method of enhancing the diversity of data may be used by applying various types of different data sets or by transforming an image for training the model. However, the effect thereof may be significantly limited in an aspect of performance enhancement. For example, in the case of a specific class, such as a pedestrian, although a size of a data set may be large, a ratio of individual instances included in the data set may be relatively small. Accordingly, it may be difficult to secure a sufficient number of objects by simply increasing the size of the data set.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented object detection method includes receiving an input image, generating a latent variable that indicates a feature distribution of the input image, and detecting an object in the input image based on the generated latent variable.

The generating of the latent variable may include extracting a feature of the input image with a neural network, and acquiring the latent variable with the neural network, wherein the neural network encodes the input image and determines a feature distribution corresponding to the feature of the input image.

The neural network may be trained based on at least one of a real image and a synthetic image that is filtered based on a score of a transformed synthetic image that is acquired by transforming the synthetic image to a fake image of the real image.

The latent variable may include a feature used to translate a domain of the input image and a feature used to detect the object.

The feature used to translate the domain of the input image may include a feature that is shared between a feature used to translate a first domain of a synthetic image to a second domain of a real image, and a feature used to translate the second domain to the first domain.

The latent variable may include a multi-dimensional mean vector and a multi-dimensional distribution vector.

The detecting of the object in the input image may include acquiring information indicating a location of the object in the input image, and acquiring information that classifies the object.

In a general aspect, a learning method includes translating a first domain of a synthetic image to a second domain of a real image, calculating a score of the synthetic image, filtering the synthetic image based on the calculated score, and training a neural network that detects an object included in an input image based on the filtered synthetic image.

The filtering of the synthetic image may include comparing the score to a threshold value, and selecting the synthetic image in response to the score being greater than or equal to the threshold value.

The training of the neural network may include training the neural network based on at least one of the real image and the filtered synthetic image.

The training of the neural network may include encoding the filtered synthetic image based on an encoder of the second domain, generating a latent variable based on a result of the encoding, detecting the object included in the input image based on the generated latent variable and a detector, acquiring a detection loss based on a similarity level between a ground truth associated with the object and a result of the detection, and training the detector based on the acquired detection loss.

The training of the neural network may include generating a fake image of the first domain by decoding the latent variable in the first domain, generating a fake image of the second domain by decoding the latent variable in the second domain, acquiring a first adversarial loss based on a level of distinction between the synthetic image and the fake image of the first domain, acquiring a first loss based on a similarity level between the filtered synthetic image and the fake image of the second domain, and training the encoder of the second domain based on the first adversarial loss and the first loss.

The latent variable may include a feature shared between a feature used to translate the first domain of the synthetic image to the second domain of the real image, and a feature used to translate the second domain to the first domain, and a feature used to detect the object.

In a general aspect, an object detection apparatus includes a communication interface configured to receive an input image, and a processor configured to generate a latent variable that indicates a feature distribution of the input image, and detect an object in the input image based on the generated latent variable.

The processor may be further configured to extract a feature of the input image with a neural network, and acquire the latent variable with the neural network, wherein the neural network is configured to encode the input image and determine a feature distribution corresponding to the feature of the input image.

The neural network may be trained based on at least one of a real image and a synthetic image that is filtered based on a score of a transformed synthetic image that is acquired by transforming the synthetic image to a fake image of the real image.

The latent variable may include a feature used to translate a domain of the input image and a feature used to detect the object.

The feature used to translate the domain of the input image may include a feature that is shared between a feature used to translate a first domain of a synthetic image to a second domain of a real image and a feature used to translate the second domain to the first domain.

The processor may be further configured to acquire information indicating a location of the object in the input image, and to acquire information used to classify the object.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise. The terms "comprises," "comprising," "includes," and "including" specify the presence of stated features, numbers, operations, elements, components, or combinations thereof, but do not preclude the presence or addition of one or more other features, numbers, operations, elements, components, or combinations thereof.

Unless otherwise defined, all terms used herein, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. Like numbers refer to like elements throughout.

The following example embodiments may be used for an augmented reality navigation system, for example, a smart vehicle, to display a lane and to generate visual information used for steering of an automatic driving vehicle. The example embodiments may be used for a device including an intelligence system, for example, a head up display (HUD), installed for driving assistance or complete automatic driving in a vehicle to translate visual information and to help a safe and pleasant driving. Further, the example embodiments may be applied to, for example, an automatic driving vehicle, an intelligent vehicle, a smartphone, and a mobile device. However, the devices are not limited thereto. Hereinafter, the example embodiments are described with reference to the accompanying drawings. Like reference numerals used herein may refer to like elements throughout.

Figure 1:
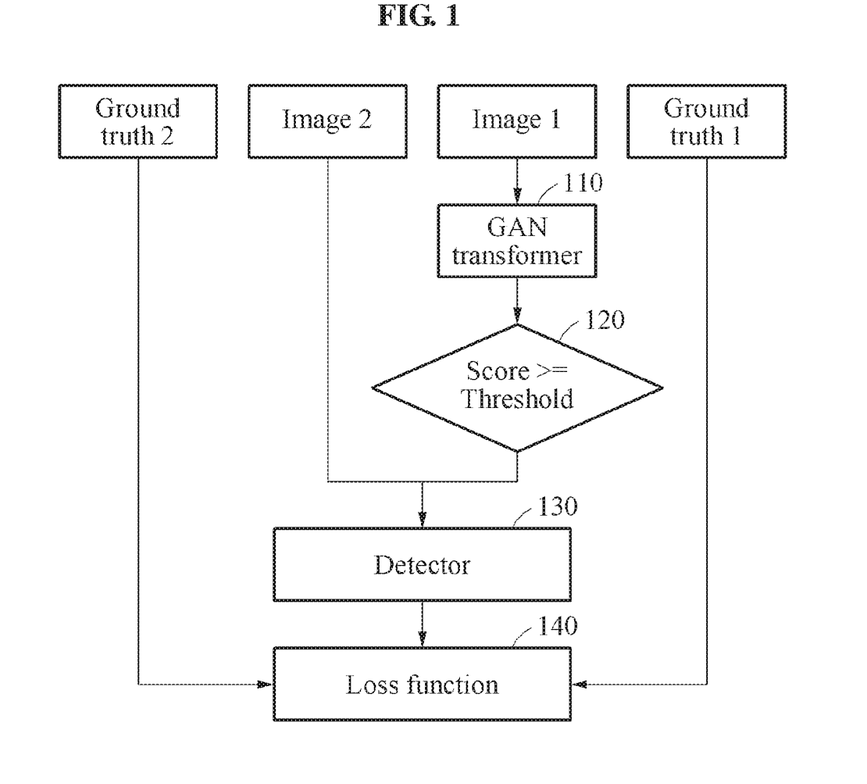
FIG. 1 illustrates an example of an object detection learning method in accordance with one or more embodiments.

FIG. 1 illustrates an example of an object detection learning method. Hereinafter, a configuration and an operation of a learning apparatus is described with reference to FIG. 1.

Typically, when detecting and/or segmenting an object in an image, a class in which data pertaining to a specific object is significantly insufficient may be present in the image. It may be difficult to acquire data of such a class, and a labeling process may be necessary after acquiring data. Thus, a relatively large amount of time and cost may be needed to acquire learning data.

In one example, data of a necessary specific class, for example, a pedestrian, may be infinitely generated using a synthetic image similar to a real driving image, which is generated by a computer simulator.

Hereinafter, the synthetic image is also referred to as image 1 and a real image is also referred to as image 2. A domain of the synthetic image may be understood as a first domain, and a domain of the real image may be understood as a second domain. Ground truth information (GT) of the synthetic image is also referred to as ground truth 1, and ground truth information of the real image is also referred to as ground truth 2. Additionally, a fake image of the synthetic image is also referred to as image 1' and a fake image of the real image is also referred to as image 2'. In an example, the ground truth information may refer to correct answer information indicating which object is present at which location in the synthetic image and the real image. In an example, a fake image of each image may be an image represented by translating a domain of a corresponding image. For example, the fake image of the synthetic image may be an image represented by translating the synthetic image of the first domain to the second domain, and the fake image of the real image may be an image represented by translating the real image of the second domain to the first domain.

In one example, the learning apparatus trains a detector 130 based on the real image (image 2) of the second domain. The learning apparatus may train the detector 130 by a loss function 140 based on a similarity level between the real image and ground truth 2 of the real image. The use of the term "may" herein with respect to an example or embodiment, e.g., as to what an example or embodiment may include or implement, means that at least one example or embodiment exists where such a feature is included or implemented while all examples and embodiments are not limited thereto.

Also, the learning apparatus may train the detector 130 based on the synthetic image (image 1) in addition to the real image (image 2). The learning apparatus translates the first domain of the synthetic image (image 1) to the second domain of the real image (image 2) and uses the real image and the domain-translated synthetic image as learning data. Since the learning apparatus uses the real image and the domain-translated synthetic image together, a large amount of data for object detection may be easily secured and the diversity of data may be enhanced.

The learning apparatus translates the first domain of the synthetic image (image 1) to the second domain of the real image (image 2) using a generative adversarial network (GAN) transformer 110. The learning apparatus calculates a score of the synthetic image of which the first domain is translated to the second domain of the real image, and filters the domain-translated synthetic image (image 1) based on the score. For example, the learning apparatus determines whether the score is greater than or equal to a preset threshold using a filter 120 and, in response to the score being greater than or equal to the threshold, selects the domain-translated synthetic image and uses the selected synthetic image to train a neural network. In an example, a fake accuracy score represents an accuracy level of a domain-translated image and corresponds to an output of a discriminator, for example, a second discriminator 416 of FIG. 4, included in the GAN transformer 110. The score may have a value, for example, of 0 to 1.

For example, if the score of the domain-translated synthetic image is greater than or equal to a threshold of 0.9, the learning apparatus may transfer the domain-translated synthetic image to the detector 130 to use the domain-translated synthetic image for learning. The learning apparatus may automatically evaluate performance of the domain-translated synthetic image with a value that is normalized based on an appropriately set threshold, and sets a level of an image used for learning at a desired level. In one example, since the domain-translated synthetic image of a level greater than or equal to the threshold, that is, the domain-translated synthetic image to be similar to the real image is used to train the detector 130, the detection performance of the detector 130 may also be enhanced.

The learning apparatus trains the detector 130 with the loss function 140 based on a similarity level between the domain-translated synthetic image transferred to the detector 130 and the ground truth 1 of the synthetic image. In addition, the learning apparatus may train the detector 130 with the loss function 140 based on a similarity level between the real image and the ground truth 2 of the real image.

The learning apparatus may train the detector 130, which is configured to detect an object included in an input image, based on the filtered synthetic image. The detector 130 may include, for example, a convolutional neural network (CNN), a deep neural network (DNN), and a support vector machine (SVM). In such an example, the DNN may include one or more of a fully connected network, a deep convolutional network, a recurrent neural network (RNN), a recurrent deep neural network (RDNN), and/or a bidirectional recurrent neural network (BDRNN) may include different or overlapping neural network portions respectively with such full, convolutional, recurrent connections, and/or bidirectional recurrent connections. The detector 130 may be a region-based CNN in which road markings, for example, lane markings of road surface images, and a crosswalk marking, and vehicles are trained in advance. In the CNN, an object to be detected in an image and a bounding box of the object to be detected are trained in advance.

The neural networks may be processor implemented neural network models, and various processes may be implemented through the neural network models as specialized computational architectures, which after substantial training may provide computationally intuitive mappings between input patterns and output patterns or pattern recognitions of input patterns, as non-limiting examples. The trained capability of generating such mappings or performing such example pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

Various physical quantities, for example, a cross entropy value and a least square error (LSE) value, may be used for the loss function 140.

Figure 2:
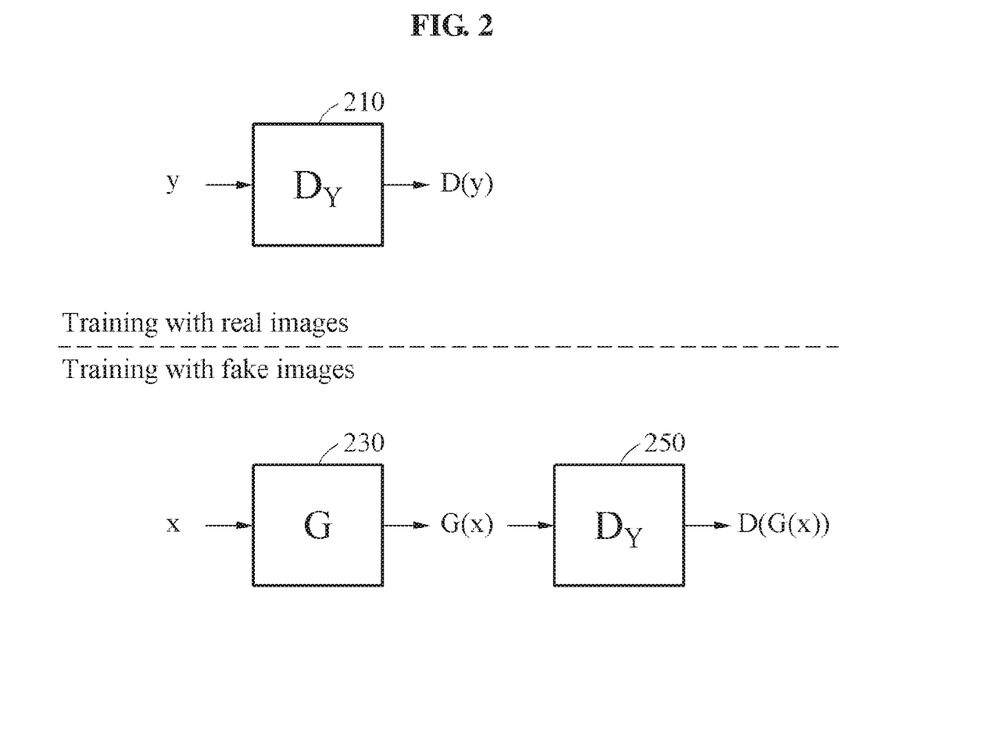
FIG. 2 illustrates an example of an operation of a generative adversarial network in accordance with one or more embodiments.

FIG. 2 illustrates an example of an operation of a GAN transformer. An upper portion of FIG. 2 illustrates a process of training a discriminator ($D_Y$) 210 based on a real image, and a lower portion of FIG. 2 illustrates a process of training a generator (G) 230 and a discriminator ($D_Y$) 250 based on a domain-translated synthetic image or a fake image.

The discriminator 210 discriminates a real image from a fake image. For example, the discriminator 210 outputs "1" for the real image and outputs "0" for the fake image.

The discriminator 250 discriminates a real image of a second domain from a synthetic image of which a first domain is translated to the second domain. The discriminator 250 is trained to output "1" for the real image of the second domain and to output "0" for the domain-translated synthetic image.

In an example, the generator 230 receives a random code or a latent code x, and generates a synthetic image G(x). The discriminator 250 is trained to output "1" based on the synthetic image G(x) generated by the generator 230.

Hereinafter, an operation of the generator 230 and the discriminator 250 is further described based on Equation 1 below, for example.

$$\mathcal{L}_{GAN}(G, D_Y, X, Y) = \mathbb{E}_{y \sim p_{data}(y)}[\log D_Y(y)] + \mathbb{E}_{x \sim p_{data}(x)}[\log(1 - D_Y(G(x)))] \quad \text{Equation 1:}$$

Hereinafter, the operation is described from the perspective of a discriminator $D_Y$.

In Equation 1, $y \sim p_{data}(y)$ denotes a probability density function and indicates sampling the distribution of real data. For example, if learning data includes 1000 pedestrian images, $y \sim p_{data}(y)$ may extract a single "y" value from each of the 1000 pedestrian images.

The discriminator $D_Y$ may output a value close to "1" for the real image, and thus may be represented to equationally maximize a value of [log $D_Y(y)$]. The discriminator $D_Y$ outputs a value between 0 and 1.

In the relation $x \sim p_{data}(x)$, "x" denotes a random value. "x" may be input to a generator G. The generator G samples a multi-dimensional vector based on, for example, a Gaussian distribution (normal distribution). The generator G receives a random multi-dimensional vector x and generates a synthetic image of a second domain from a synthetic image of a first domain. The generator G may also be referred to as a transformer since the generator G generates a domain-translated image. In response to receiving the synthetic image G(x), the generator G may output a value close to zero. It may be represented as [log(1−$D_Y$(G(x)))] equationally.

Hereinafter, the operation is described from the perspective of the generator G.

In Equation 1, a value of $\mathbb{E}_{y \sim p_{data}(y)}[\log D_Y(y)]$ may be minimized and the generator G may not be used to train the discriminator $D_Y$. Therefore, $y \sim p_{data}(y)$ may correspond to a portion in which the generator G is not involved in Equation 1. The generator G may be trained to minimize $\mathbb{E}_{x \sim p_{data}(x)}[\log(1 - D_Y(G(x)))]$ in Equation 1. Contrary to the discriminator $D_Y$, the generator G may be trained so that $D_Y(G(x))$ =1.

In one example, the discriminator $D_Y$ may be trained to output "1" for a real image of a second domain, and to output "0" for a synthetic image of which a first domain is translated to the second domain. Various quantities, for example, a cross entropy value and a LSE value, may be used to train the discriminator $D_Y$.

Figure 3:
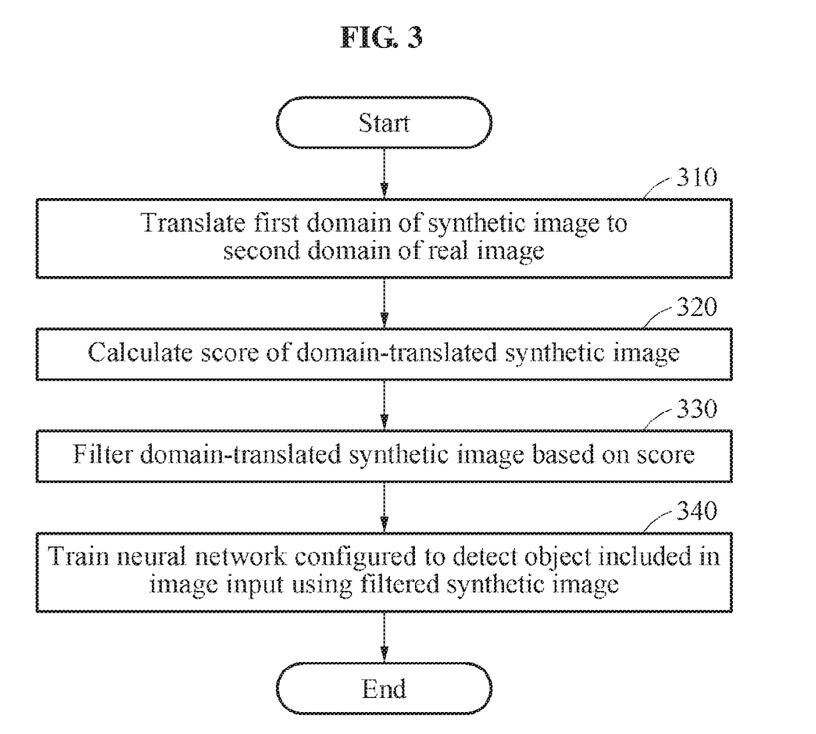
FIG. 3 is a flowchart illustrating an example of an object detection learning method in accordance with one or more embodiments.

FIG. 3 is a flowchart illustrating an example of an object detection learning method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a learning apparatus translates a first domain of a synthetic image to a second domain of a real image.

In operation 320, the learning apparatus calculates a score of the domain-translated synthetic image.

In operation 330, the learning apparatus filters the domain-translated synthetic image based on the score. For example, the learning apparatus compares the score to a threshold and selects the synthetic image of which the first domain is translated to the second domain and uses the selected synthetic image to train a neural network.

In operation 340, the learning apparatus trains the neural network configured to detect an object included in an image input based on the filtered synthetic image. The learning apparatus may train the neural network using at least one of the real image and the synthetic image filtered in operation 330. A method of training, by the learning apparatus, the neural network is further described with reference to FIGS. 4 through 6.

Figure 4:
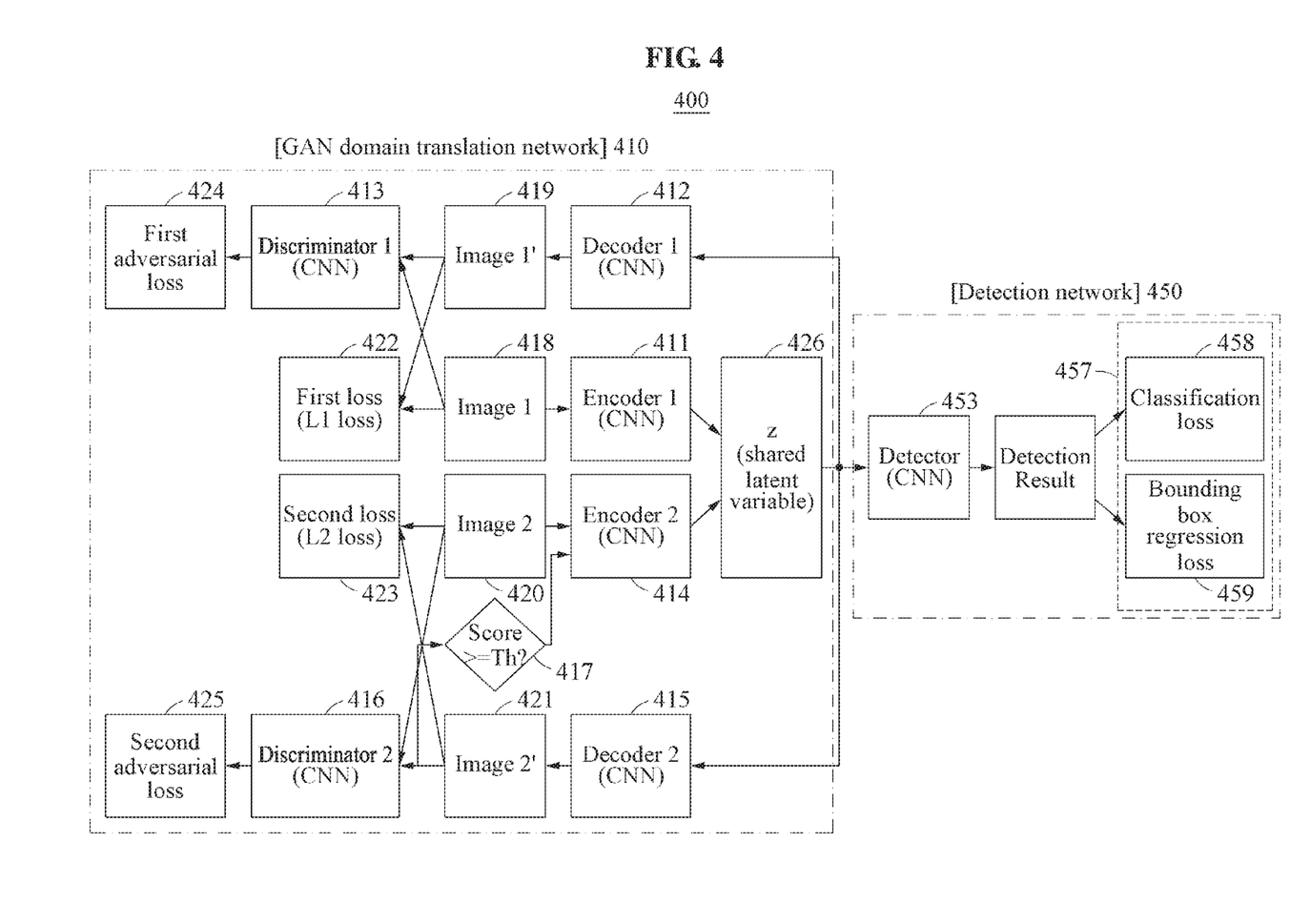
FIG. 4 illustrates an example of an operation of an object detection learning apparatus in accordance with one or more embodiments.

FIG. 4 illustrates an example of an operation of a learning apparatus for object detection. Referring to FIG. 4, a learning apparatus 400 includes a GAN domain translation network 410 and a detection network 450.

The GAN domain translation network 410 performs a domain translation between two images, for example, a real image and a synthetic image. The GAN domain translation network 410 translates a first domain of the synthetic image to a second domain of the real image, or translates the second domain of the real image to the first domain of the synthetic image.

Additionally, the GAN domain translation network 410 may remove unnecessary information, for example, information associated with an image having a relatively low similarity or low quality, between different images or different data sets and extracts common information, for example, a latent variable Z, necessary for detecting an object of a specific class as a feature. The common information may be shared for domain translation during a learning process and may be used for object detection.

In one example, the learning apparatus 400 may automatically translate a domain of an image, thereby achieving a sufficient amount of learning data and enhancing the object detection performance based on learning data with at least a desired quality.

The GAN domain translation network 410 may include a first encoder (encoder 1) 411, a first decoder (decoder 1) 412, a first discriminator (discriminator 1) 413, a second encoder (encoder 2) 414, a second decoder (decoder 2) 415, a second discriminator (discriminator 2) 416, and a filter 417. The first encoder 411, the first decoder 412, and the first discriminator 413 may correspond to the first domain of the synthetic image. The second encoder 414, the second decoder 415, and the second discriminator 416 may correspond to the second domain of the real image.

In an example, the first encoder 411 encodes the synthetic image (image 1) of the first domain, and extracts a feature of the synthetic image. The first encoder 411 extracts high-level knowledge from the synthetic image (image 1) 418.

The first decoder 412 decodes a latent variable Z in the first domain and generates a fake image (image 1') 419 of the synthetic image (image 1) 418 of the first domain. The fake image (image 1') 419 of the synthetic image (image 1) 418 of the first domain may also be represented as the fake image of the first domain or the fake image of the synthetic image.

In an example, the latent variable Z may include a feature shared between a feature used to translate the first domain of the synthetic image (image 1) 418 to the second domain of the real image (image 2) 420 and a feature used to translate the second domain to the first domain. The latent variable Z refers to data generated when the synthetic image (image 1) 418 and the real image (image 2) 420 pass through the first encoder 411 and the second encoder 414, respectively, and has a resolution that is less than the resolution of the synthetic image (image 1) 418 and the resolution of the real image (image 2) 420.

The first encoder 411 and the first decoder 412 may be trained based on a first loss 422. The first loss 422 is also referred to as an L1 loss. A process of training the first encoder 411 and the first decoder 412 based on the first loss 422 is further described with reference to FIG. 5.

The first discriminator 413 discriminates the synthetic image (image 1) 418 of the first domain from the fake image (image 1') 419 of the first domain. The first discriminator 413 may be trained based on a first adversarial loss 424.

The second encoder 414 encodes the real image (image 2) 420 of the second domain, and extracts a feature of the real image 420. The second encoder 414 extracts high-level knowledge from the real image (image 2) 420 of the second domain.

The second decoder 415 decodes the latent variable Z in the second domain and generates a fake image (image 2') 421 of the real image (image 2) 420 of the second domain. The fake image (image 2') 421 of the real image (image 2) 420 of the second domain may also be represented as the fake image of the second domain or the fake image of the real image.

The second encoder 414 and the second decoder 415 may be trained based on a second loss 423. The second loss 423 is also referred to as an L2 loss.

The second discriminator 416 discriminates the real image (image 2) 420 of the second domain from the fake image (image 2') 421 of the second domain. The second discriminator 416 may be trained based on a second adversarial loss 425. A method of training the second discriminator 416 based on the second adversarial loss is further described with reference to FIG. 6.

The filter 417 compares a score of the synthetic image (image 1) 418 of which the first domain is translated to the second domain of the real image (image 2) 420 to a threshold, and filters the domain-translated synthetic image.

For example, when the detection performance is significantly degraded due to a lack of data of a specific class, first domain data of the synthetic image with which it is possible to easily generate ground truth information may be transformed to second domain data of the real image, and the transformed data may be used for detection. In an example, the learning apparatus 400 determines whether to use the domain-translated synthetic image to train the detection network 450, based on the score of the synthetic image of which the first domain is translated to the second domain, and automatically generates a desired amount of learning data. The learning apparatus 400 generates at least a desired level of learning data through the above process.

The domain-translated synthetic image that is filtered through the filter 417 may pass through the second encoder 414 and the latent variable Z 426, may be generated into the fake image of the second domain through the second decoder 415, and used to calculate the second loss. Additionally, the domain-translated synthetic image that is filtered through the filter 417 may pass through the second encoder 414 and the latent variable Z 426, may be generated into the fake image of the first domain through the first decoder 412, and used to calculate the second adversarial loss.

In addition, the domain-translated synthetic image that is filtered through the filter 417 may pass through the second encoder 414 and the latent variable Z 426, and may be used to calculate a detection loss through a detector 453 of the detection network 450.

Theoretically, a first adversarial loss value of the first discriminator 413 and a second adversarial loss value of the second discriminator 416 may converge to 0.5 at a point in time at which training of the GAN domain translation network 410 is terminated. For example, although an adversarial loss value may be '1' for a real class and '0' for a fake class, various loss values may be applied based on which loss function is used. It is provided as an example only. Any quantitative value capable of discriminating a real image from a fake image may be used.

Referring again to FIG. 4, the detection network 450 may detect an object based on information that is extracted by the GAN domain translation network 410. The detection network 450 may include the detector 453.

In detail, the learning apparatus 400 encodes the synthetic image filtered by the filter 417 with the second encoder 414 corresponding to the second domain, and generates a latent variable based on the encoding result. The learning apparatus 400 detects an object included in an input image using the latent variable and the detector 453.

The detector 453 detects the object from the latent variable Z. The detection result of the detector 453 may include coordinate values of a bounding box in which an object corresponding to a preset class is present between the synthetic image (image 1) 418 and the real image (image 2) 420, and a presence probability of the object. The presence probability of the object may be represented as, for example, a number between 0 and 1.

The detection result is a result acquired by comparing the object detected by the detector 453 to ground truth information and a similarity level with the ground truth information may be measured with a detection loss 457. The detection loss 457 may be based on a similarity level between ground truth information associated with the object and the detection result.

The detection loss 457 may include, for example, a classification loss 458 and a bounding box regression loss 459. The classification loss 458 may be used to determine whether a class of the object included in the detection result is the same as that of the ground truth information. For example, the classification loss 458 may be a cross-entropy loss. The bounding box regression loss 459 may be used to measure a localization accuracy of a bounding box of the object included in the detection result. For example, the bounding box regression loss 459 may correspond to a regression loss function.

The detector 453 may be trained based on the detection loss 457.

In an example, the learning apparatus 400 may use the synthetic image (image 1) 418 to update parameters of the first encoder 411, the first decoder 412, the second encoder 414, and the second decoder 415 in a manner that the synthetic image (image 1) 418 passes through the GAN domain translation network 410 and the detection network 450.

The first encoder 411, the first decoder 412, the first discriminator 413, the second encoder 414, the second decoder 415, the second discriminator 416, and the detector 453 may be configured by various types of neural networks in addition to, for example, a CNN, a DNN, and an SVM.

Depending on example embodiments, the first encoder 411 and the first decoder 412 may be configured as a first auto-encoder, and the second encoder 414 and the second decoder 415 may be configured as a second auto-encoder.

Figure 5:
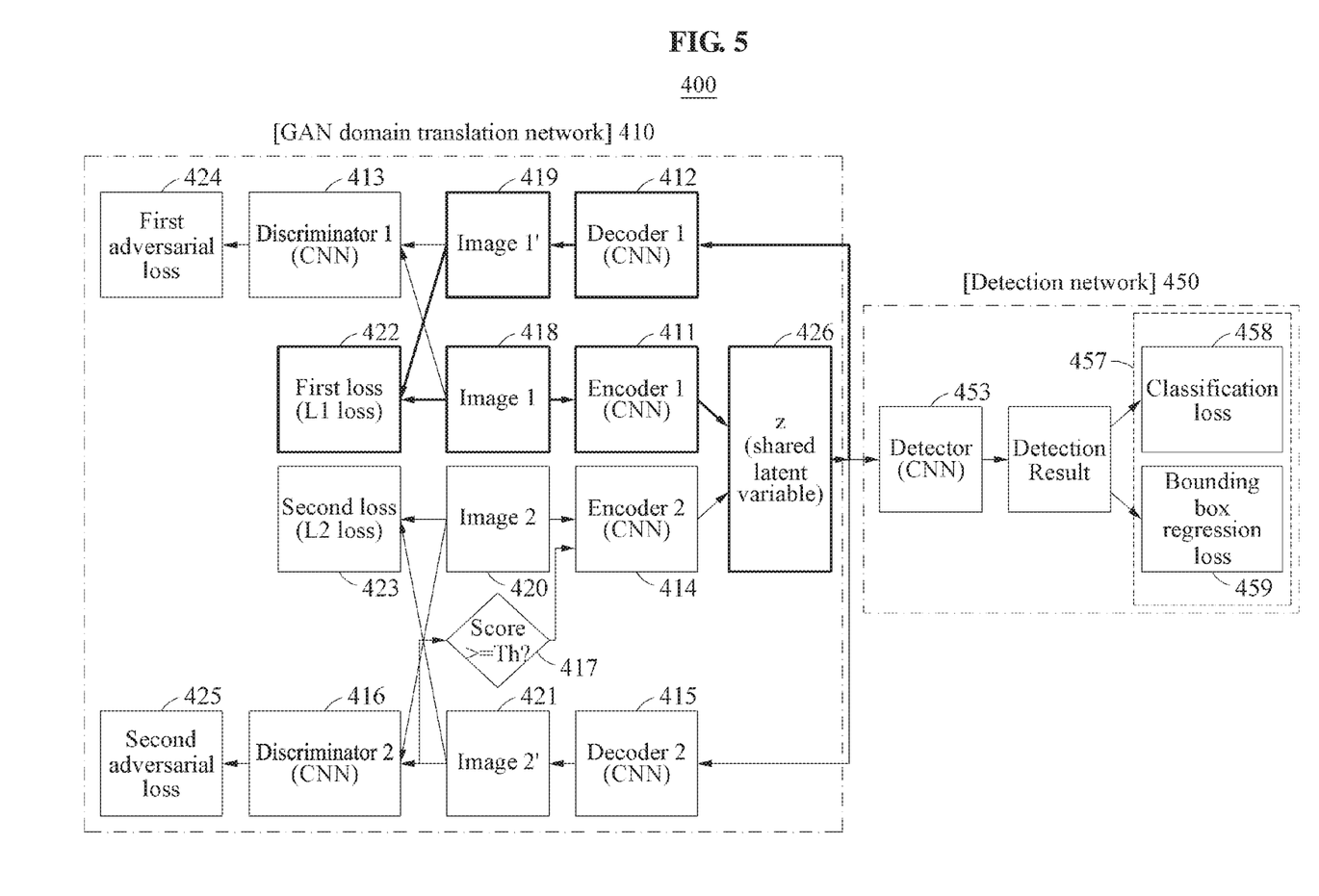
FIGS. 5 and 6 illustrate examples of training a domain translation network in the learning apparatus of FIG. 4.

FIG. 5 illustrates an example of training a domain translation network in the learning apparatus of FIG. 4. Hereinafter, a process of training the first encoder 411 and the first decoder 412 based on the first loss is described with reference to FIG. 5.

Referring to FIG. 5, the synthetic image (image 1) 418 is transferred in order of first encoder 411→latent variable Z 426→first decoder 412. Once the synthetic image (image 1) 418 is input to the learning apparatus 400, the first encoder 411 extracts a feature from the synthetic image (image 1) 418. The feature extracted by the first encoder 411 is applied to a neural network to determine a feature distribution corresponding to the feature of the image and output to the latent variable Z 426. The first decoder 412 decodes the latent variable in the first domain and generates the fake image (image 1') 419 of the first domain.

The learning apparatus 400 acquires the first loss 422 based on a similarity level between the synthetic image (image 1) 418 and the fake image (image 1') 419 of the first domain. For example, the first loss 422 may be an L1 distance between the synthetic image (image 1) 418 and the fake image (image 1') 419 of the first domain.

A gradient of the first loss 422 to the fake image (image 1') 419 of the first domain is back-propagated relative to a path through which the synthetic image (image 1) is propagated in FIG. 4, and used to update parameters of the first encoder 411 and the first decoder 412 present in the corresponding path.

In addition, the real image (image 2) 420 is transferred in order of second encoder 414→latent variable Z 426→second decoder 415. The second decoder 415 decodes the latent variable in the second domain and generates the fake image (image 2') 421 of the second domain. In an example, the generated fake image of the second domain is filtered through the filter 417 and input to the second encoder 414. Here, the filter 417 may correspond to the filter 120 of FIG. 1.

The second encoder 414 encodes the filtered fake image of the second image and the real image (image 2) 420 and extracts a feature closer to the real image (image 2) 420 from the filtered fake image of the second domain.

The learning apparatus 400 acquires the second loss 423 based on a similarity level between the real image (image 2) 420 and the fake image (image 2') 421 of the second domain. For example, the second loss 423 may be an L2 distance between the real image (image 2) 420 and the fake image (image 2') 421 of the second domain.

Figure 6:
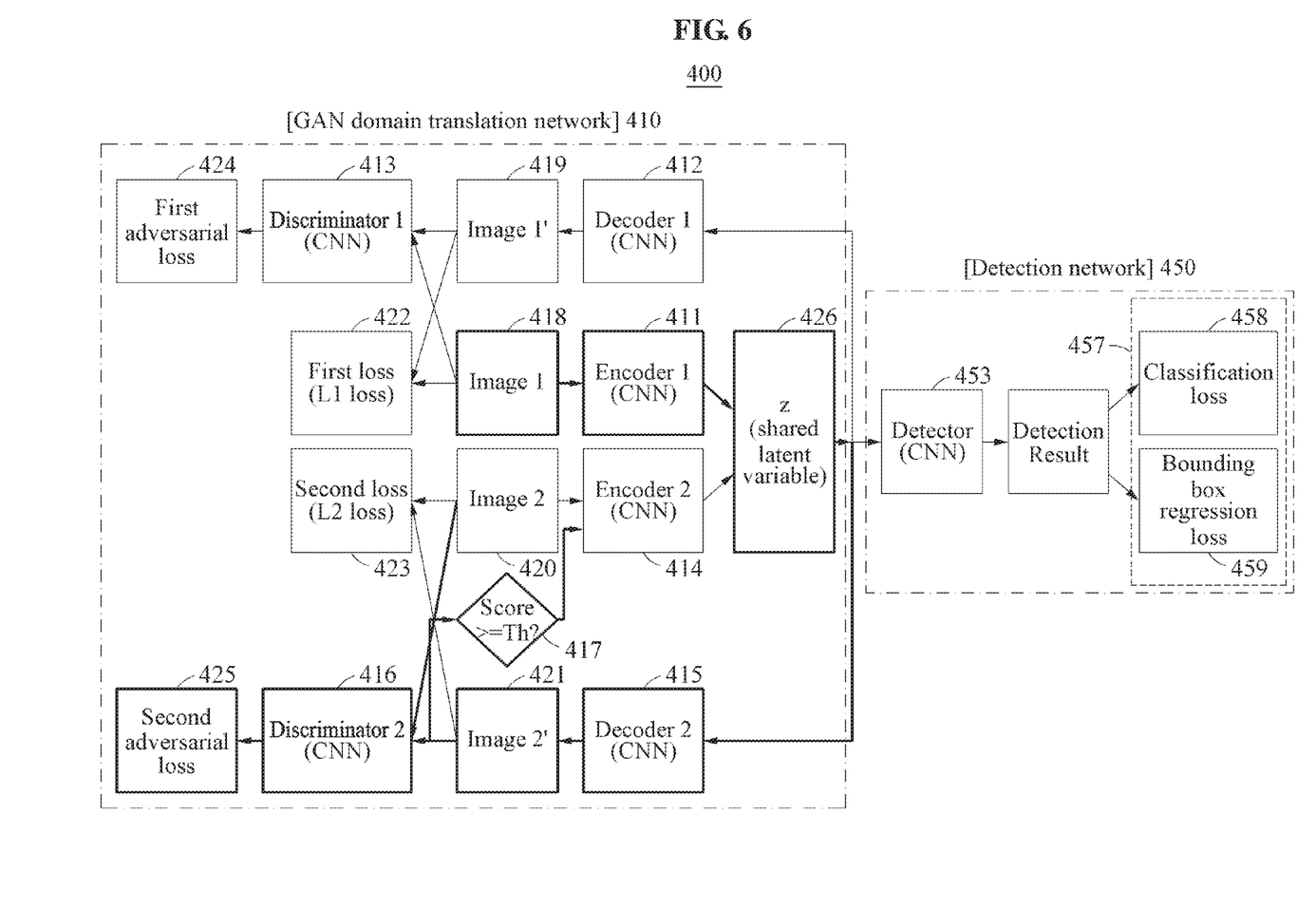

FIG. 6 illustrates an example of training a domain translation network in the learning apparatus of FIG. 4. Hereinafter, a process of training the second discriminator 416 based on a second adversarial loss is described with reference to FIG. 6.

For example, it is assumed that the synthetic image (image 1) 418 is transferred in order of first encoder 411→latent variable Z 426→second decoder 415. The second decoder 415 decodes the latent variable and generates the fake image (image 2') 421 of the second domain. The above process may be performed by the GAN transformer 110 of FIG. 1.

Each of the real image (image 2) 420 of the second domain and the fake image (image 2') 421 of the second domain passes through the second discriminator 416. The learning apparatus 400 acquires the second adversarial loss 425 based on a discrimination level between the synthetic image and the fake image of the first domain through the second discriminator 416. The second adversarial loss 425 is back-propagated relative to a path through which the synthetic image (image 1) 418 is propagated, and used to train the second discriminator 416.

The second decoder 415 may be trained based on the second adversarial loss 425 and the second loss 423.

Figure 7:
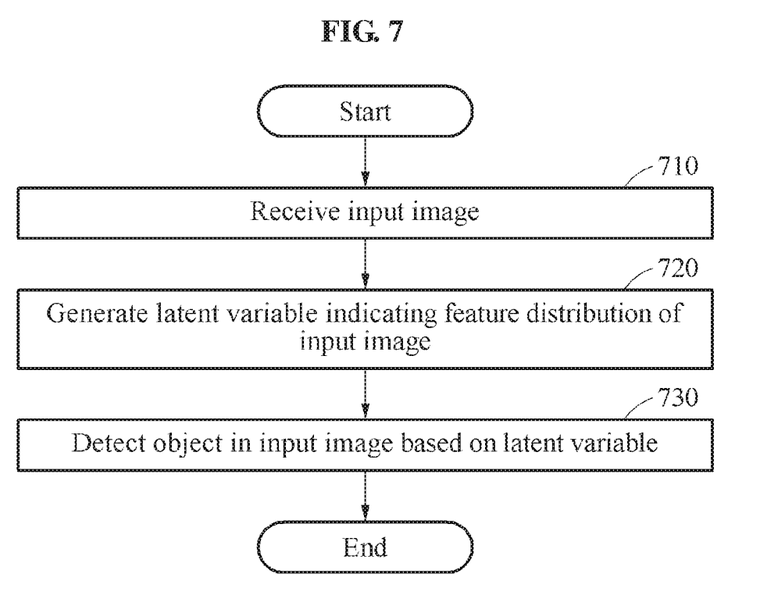
FIG. 7 is a flowchart illustrating an example of an object detection method in accordance with one or more embodiments.
Figure 8:
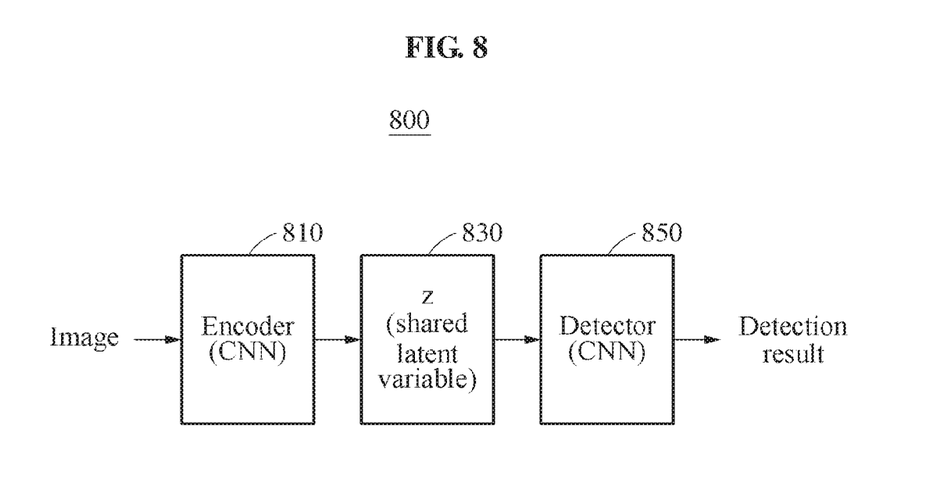
FIG. 8 illustrates an example of an operation of an object detection apparatus in accordance with one or more embodiments.

FIG. 7 is a flowchart illustrating an example of an object detection method, and FIG. 8 illustrates an example of an operation of an object detection apparatus. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIGS. 7 and 8, in operation 710, an object detection apparatus receives an input image.

In operation 720, the object detection apparatus generates a latent variable indicating a feature distribution of the input image. In operation 720, the object detection apparatus may extract the feature of the input image using, for example, an encoder 810 configured to encode the input image. The encoder 810 is configured as, for example, a CNN and various types of neural networks. The object detection apparatus acquires a latent variable 830 based on the encoder 810 which is configured to determine a feature distribution corresponding to the feature of the input image. The latent variable 830 may include a multidimensional mean vector and a multidimensional distribution vector. Additionally, the latent variable 830 may include a feature used to translate a domain of the input image and a feature used to detect an object. The feature used to translate the domain of the input image may include a feature shared between a feature used to translate a first domain of a synthetic image to a second domain of a real image and a feature used to translate the second domain to the first domain. In an example, the encoder 810 may be trained based on at least one of the real image and the synthetic image that is filtered based on a score of a transformed synthetic image acquired by transforming the synthetic image to a fake image of the real image.

Referring to FIG. 7, in operation 730, the object detection apparatus detects an object in the input image based on the latent variable. In operation 730, the object detection apparatus acquires at least one of information indicating a location of the object in the input image and information used to classify the object. The object detection apparatus detects the object in the input image by inputting at least one of the information indicating the location of the object and information used to classify the object to a pretrained detector 850. Additionally, the detector 850 may be configured as a CNN or other various neural networks.

Figure 9:
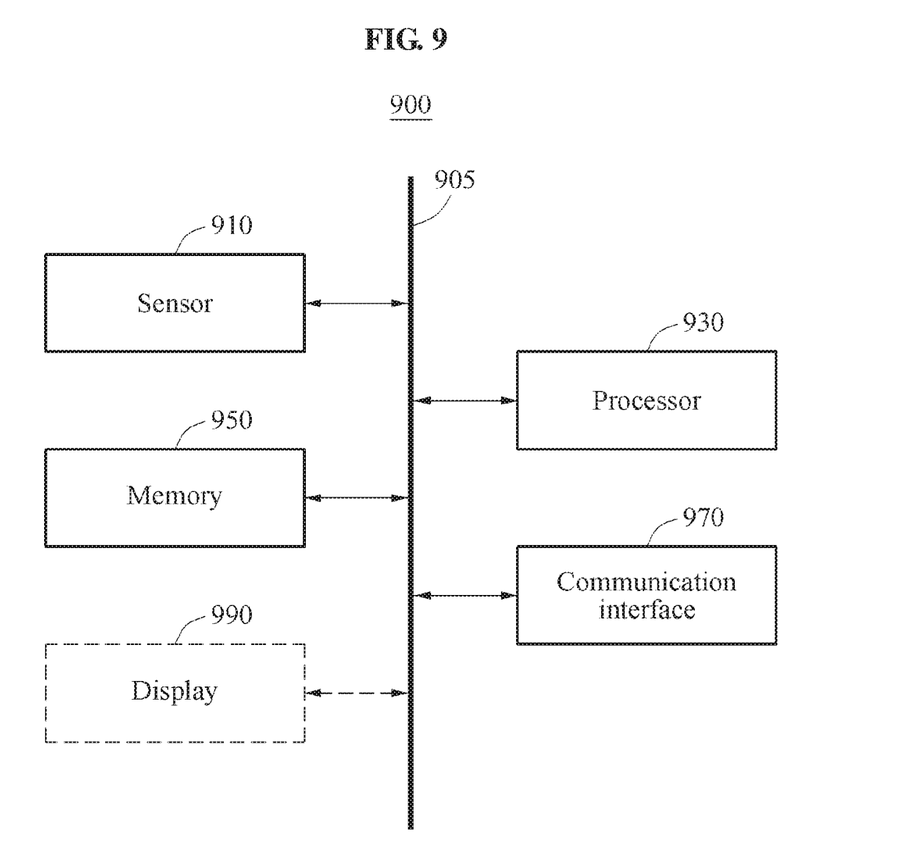
FIG. 9 illustrates an example of an object detection apparatus in accordance with one or more embodiments.

FIG. 9 illustrates an example of an object detection apparatus. Referring to FIG. 9, the object detection apparatus 900 includes a processor 930 and a communication interface 970. The object detection apparatus 900 further includes a sensor 910, a memory 950, and a display 990. The sensor 910, the processor 930, the memory 950, the communication interface 970, and the display 990 may communicate with each other through a communication bus 905.

The sensor 910 may be, for example, a camera sensor, an image sensor, and a vision sensor. It is provided as an example only. The sensor 910 may be mounted to a vehicle to take a driving image of the vehicle.

The processor 930 generates a latent variable indicating a feature distribution of an input image received through the communication interface 970. The processor 930 detects an object in the input image based on the latent variable. Depending on example embodiments, the processor 930 generates the latent variable using an input image acquired through the sensor 910 or generates the latent variable using the input image received through the communication interface 970 and the input image acquired through the sensor 910.

The processor 930 extracts the feature of the input image with a neural network configured to encode the input image, and acquires the latent variable with the neural network configured to determine the feature distribution corresponding to the feature of the input image. In an example, the neural network may be trained based on at least one of a real image and a synthetic image that is filtered based on a score of a transformed synthetic image acquired by transforming the synthetic image to a fake image of the real image. The latent variable may include, for example, a feature used to translate a domain of the input image and a feature used to detect the object. The feature used to translate the domain of the input image may include a feature shared between a feature used to translate a first domain of the synthetic image to a second domain of the real image and a feature used to translate the second domain to the first domain.

The processor 930 may acquire information indicating a location of the object in the input image and acquire information to classify the object.

The processor may 930 execute at least one of the methods described above with reference to FIGS. 1 through 8, or an algorithm corresponding thereto. The processor 930 may execute a program and control the object detection apparatus 900. A code of the program executed by the processor 930 may be stored in the memory 950.

The processor 930 may be configured as, for example, a central processing unit (CPU) or a graphics processing unit (GPU).

The memory 950 may store the input image and the latent variable indicating the feature distribution of the input image. The memory 950 may store the latent variable in association with the input image. The memory 950 may be, for example, a volatile memory or a non-volatile memory.

The communication interface 970 may receive the input image. The communication interface 970 may receive information on a driving image captured from an area external to the object detection apparatus 900 or information on various types of sensors received from an area external to the object detection apparatus 900 and map information. Depending on examples, the communication interface 970 may transmit the object detected by the processor 930 to the outside of the object detection apparatus 900 or the display 990.

The display 990 may display the object detected in the input image. The display 990 may display the object with, or separate from, the input image and/or the map information.

For example, when the object detection apparatus 900 is embedded in the vehicle, the display 990 may be configured as a HUD installed in the vehicle.

The object detection apparatus 900, apparatuses, encoders 411, 414, 810, decoders 412, 415, discriminators 413, 416, detectors 453, 850, sensor 910, processor 930, memory 950, communication interface 970, display 990 and devices, and other components described herein with respect to FIGS. 1-9, are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-9, and that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented object detection method comprising:
   receiving an input image;
   generating a latent variable that indicates a feature distribution of the input image; and
   detecting an object in the input image based on the generated latent variable.

2. The method of claim 1, wherein the generating of the latent variable comprises:
   extracting a feature of the input image with a neural network; and
   acquiring the latent variable with the neural network,
   wherein the neural network encodes the input image and determines a feature distribution corresponding to the feature of the input image.

3. The method of claim 1, wherein the latent variable comprises a feature used to translate a domain of the input image and a feature used to detect the object.

4. The method of claim 1, wherein the latent variable comprises a multi-dimensional mean vector and a multi-dimensional distribution vector.

5. The method of claim 1, wherein the detecting of the object in the input image comprises:
   acquiring information indicating a location of the object in the input image; and
   acquiring information that classifies the object.

6. A non-transitory computer-readable recording medium storing instructions that, when executed by a processor, cause the processor to perform the object detection method of claim 1.

7. The method of claim 2, wherein the neural network is trained based on at least one of a real image and a synthetic image that is filtered based on a score of a transformed synthetic image that is acquired by transforming the synthetic image to a fake image of the real image.

8. The method of claim 3, wherein the feature used to translate the domain of the input image comprises a feature that is shared between a feature used to translate a first domain of a synthetic image to a second domain of a real image, and a feature used to translate the second domain to the first domain.

9. A learning method comprising:
translating a first domain of a synthetic image to a second domain of a real image;
calculating a score of the synthetic image;
filtering the synthetic image based on the calculated score; and
training a neural network that detects an object included in an input image based on the filtered synthetic image.

10. The method of claim 9, wherein the filtering of the synthetic image comprises:
comparing the score to a threshold value; and
selecting the synthetic image in response to the score being greater than or equal to the threshold value.

11. The method of claim 9, wherein the training of the neural network comprises training the neural network based on at least one of the real image and the filtered synthetic image.

12. The method of claim 11, wherein the training of the neural network comprises:
encoding the filtered synthetic image based on an encoder of the second domain;
generating a latent variable based on a result of the encoding;
detecting the object included in the input image based on the generated latent variable and a detector;
acquiring a detection loss based on a similarity level between a ground truth associated with the object and a result of the detection; and
training the detector based on the acquired detection loss.

13. The method of claim 12, wherein the training of the neural network comprises:
generating a fake image of the first domain by decoding the latent variable in the first domain;
generating a fake image of the second domain by decoding the latent variable in the second domain;
acquiring a first adversarial loss based on a level of distinction between the synthetic image and the fake image of the first domain;
acquiring a first loss based on a similarity level between the filtered synthetic image and the fake image of the second domain; and
training the encoder of the second domain based on the first adversarial loss and the first loss.

14. The method of claim 12, wherein the latent variable comprises a feature shared between a feature used to translate the first domain of the synthetic image to the second domain of the real image, and a feature used to translate the second domain to the first domain, and a feature used to detect the object.

15. An object detection apparatus comprising:
a communication interface configured to receive an input image; and
a processor configured to
generate a latent variable that indicates a feature distribution of the input image, and
detect an object in the input image based on the generated latent variable.

16. The apparatus of claim 15, wherein the processor is further configured to:
extract a feature of the input image with a neural network, and
acquire the latent variable with the neural network,
wherein the neural network is configured to encode the input image and determine a feature distribution corresponding to the feature of the input image.

17. The apparatus of claim 15, wherein the latent variable comprises a feature used to translate a domain of the input image and a feature used to detect the object.

18. The apparatus of claim 15, wherein the processor is further configured to acquire information indicating a location of the object in the input image, and to acquire information used to classify the object.

19. The apparatus of claim 16, wherein the neural network is trained based on at least one of a real image and a synthetic image that is filtered based on a score of a transformed synthetic image that is acquired by transforming the synthetic image to a fake image of the real image.

20. The apparatus of claim 17, wherein the feature used to translate the domain of the input image comprises a feature that is shared between a feature used to translate a first domain of a synthetic image to a second domain of a real image and a feature used to translate the second domain to the first domain.

* * * * *